United States Patent
Perkins et al.

(10) Patent No.: US 7,286,487 B2
(45) Date of Patent: Oct. 23, 2007

(54) OPTICAL TRANSMISSION NETWORK WITH ASYNCHRONOUS MAPPING AND DEMAPPING AND DIGITAL WRAPPER FRAME FOR THE SAME

(75) Inventors: Drew D. Perkins, Saratoga, CA (US); Ting-Kuang Chiang, Saratoga, CA (US); Edward E. Sprague, Woodside, CA (US); Daniel P. Murphy, Ben Lomond, CA (US)

(73) Assignee: Infinera Corporation, Sunnyvale, CA (US)

( * ) Notice: Subject to any disclaimer, the term of this patent is extended or adjusted under 35 U.S.C. 154(b) by 884 days.

(21) Appl. No.: 10/715,947

(22) Filed: Nov. 18, 2003

(65) Prior Publication Data

US 2004/0156325 A1 Aug. 12, 2004

Related U.S. Application Data

(60) Provisional application No. 60/427,159, filed on Nov. 18, 2002.

(51) Int. Cl.
*H04L 12/56* (2006.01)

(52) U.S. Cl. ..................... 370/253; 370/389

(58) Field of Classification Search ............ 370/389, 370/232, 363, 368, 374, 381, 230, 229, 429, 370/253

See application file for complete search history.

(56) References Cited

U.S. PATENT DOCUMENTS

| | | | |
|---|---|---|---|
| 5,757,871 A | 5/1998 | Furukawa et al. | |
| 2001/0022826 A1 | 9/2001 | Rude | |
| 2002/0039211 A1* | 4/2002 | Shen et al. ............ | 359/110 |
| 2002/0075980 A1 | 6/2002 | Tang et al. | |
| 2002/0084807 A1 | 7/2002 | Miyamoto et al. | |
| 2002/0138685 A1 | 9/2002 | Jones, Jr. | |
| 2002/0154659 A1 | 10/2002 | Singh et al. | |
| 2002/0167337 A1 | 11/2002 | Chelcea et al. | |
| 2003/0120799 A1 | 6/2003 | Lavhav et al. | |
| 2003/0223448 A1* | 12/2003 | Ferolito et al. ......... | 370/428 |

OTHER PUBLICATIONS

"G.709—The Optical Transport Network (OTN)", 15 Pages, Feb. 2002 (Downloaded from the web site of Acterna.com).

* cited by examiner

*Primary Examiner*—Brenda Pham
(74) *Attorney, Agent, or Firm*—W. Douglas Carothers, Jr.

(57) ABSTRACT

An optical transmission network is inherently asynchronous due to the utilization of a variable overhead ratio (V-OHR). The network architecture makes extensive use of OEO regeneration, i.e., deals with any electronic reconditioning to correct for transmission impairments, such as, for example, FEC encoding, decoding and re-encoding, signal reshaping, retiming as well as signal regeneration. The optical transmission network includes a plesiochronous clocking system with intermediate nodes designed to operate asynchronously with a single local frequency clock without complicated network synchronization schemes employing high cost clocking devices such as phase locked loop (PLL) control with crystal oscillators and other expensive system components. The asynchronous network operation provides for asynchronous remapping or remapping of any client signal utilizing any type of transmission protocol where the line side rate or frequency is always the same frequency for the payload signal and the local frequency at an intermediate node is set to a local reference clock in accordance with the payload type and its overhead ratio, i.e., the overhead ratio is varied to meet the desired difference between the line rate or frequency and the desired client signal payload rate or frequency for the particular client signal payload type.

5 Claims, 9 Drawing Sheets

OPTICAL TRANSMISSION NETWORK WITH ASYNCHRONOUS MAPPING AND DEMAPPING AND DIGITAL WRAPPER FRAME FOR THE SAME

REFERENCE TO RELATED APPLICATIONS

This application claims priority to prior provisional patent application Ser. No. 60/427,159, filed Nov. 18, 2002, which provisional patent application is incorporated herein by its reference.

BACKGROUND OF THE INVENTION

1. Field of the Invention

This invention relates generally to asynchronous clock operation in optical transmission networks and more particularly to the deployment of asynchronous operation for an optical transport network (OTN) designed to operate asynchronously by means of mapping and remapping of client signal overhead or 10GbE signal protocol where the line rate, however, is maintained constant throughout signal transport.

Introduction

As used herein, the terms "rate" and "frequency" are to have the same meaning. Also, there is discussion about deployment of the invention herein in end terminals and intermediate nodes of transmission network, in particular as exemplified in optical transmission systems following in part the OTN protocol. As used herein, reference to "nodes (NEs)" is intended to cover both "intermediate nodes" of a network as well as "end terminals". In this connection, end terminals may operate under an accurate crystal oscillator with a phase locked loop (PLL) circuit but, according to this invention, it is not necessary to employ suck crystal clocks at an intermediate node. Instead, a less expensive local reference clock may be deployed.

2. Description of the Related Art

The ITU-T G.709 entitled, "Interface for the optical transport network (OTN)", a proposed international standard for the OTN architecture is intended to converge existing packet services, such as ATM, IP Ethernet, and TDM broadband services, such as SONET and SDH, transparently via the shortest possible stack onto a single network while providing enhanced signal amplification and networking function to all client services. Like SONET, the OTN architecture assumes that the transport function through the network is synchronous in the digital or electrical/electronic domain. Frames received at the ingress of a G.709 network node are to be retransmitted at the node at an identical frame rate. The G.709 specification specifies how to synchronously or asynchronously map, for example, the SDH STM-64 protocol data into G.709 OTU2 frames and visa versa at the ingress and egress of the OTN. The G.709 specification does not specify how to map IEEE 802.3ae 10 GbE protocol data into G.709 frames, whether done synchronously or asynchronously.

SONET employs a single timing approach which has a primary benefit of enabling the combining one or more data streams at a predetermined rate into higher data rate streams and extracting one or more data streams without demultiplexing the entire higher data rate stream. The G.709 protocol basically assumes that intermediate points of the network, i.e., optical cross-connects, optical add/drop multiplexers and the like, operate in a synchronous fashion, even if asynchronous mapping of data or overhead are deployed at the network ingress or egress. This results in added system costs (COGS) because it is necessary, for example, to provide accurate clocking at each node in order to "recapture" the clock of the original transmitter node. Accurate clocking entails the utilization of high cost, phase locked loop (PLL) circuitry and an expense crystal oscillator together with other required system components.

In a plesiochronous clocking system, each subsystem or node in the network may be designed to have its own local clock generation so that different subsystems are operating at, at least, slightly different clock frequencies. To accommodate the different frequencies, bit stuffing techniques are employed. Bit stuffing is well known in the art in many different technical disciplines. For some further background concerning plesiochronous clocking systems, including ways of handing clock differences with a combination phase lock loop/delay lock loop approach, see, for example, U.S. patent application to Tang et al., Publication No. 2002/0075980, published on Jun. 20, 2002 (U.S. patent application Ser. No. 10/029,709).

As indicated above, the standard G.709 digital wrapper, the payload signal can be mapped into the digital wrapper in two ways, synchronous and asynchronous mapping. In synchronous mapping case, the digitally wrapped signal frequency is exactly equal to the incoming payload signal frequency times a fixed overhead ratio (F-OHR). If the incoming payload signal frequency varies slightly, the digitally wrapped signal frequency will track that variation. In asynchronous mapping case, the digitally wrapped signal frequency is equal to the payload envelope frequency times a fixed overhead ratio (F-OHR). The payload envelope frequency is generated by the wrapper and is not frequency locked to the incoming payload signal. The frequency difference between the payload envelope and the incoming payload signal is accommodated by some kind of justification mechanism.

In both the conventional synchronous and asynchronous mapping cases, the digitally wrapped signal frequency is scaled with the payload signal frequency. The digitally wrapped signal would be running at a different frequency if the payload signal is at a different nominal frequency. For example, the nominal frequency for OC192 is 9.95328 Gbps with +/−20 ppm variation. If the OC192 payload signal happens to be 9.95328 Gbps+10 ppm, the synchronously mapped G.709 signal would be 9.95328 times the F-OHR of 255/237 Gbps+10 ppm. If this signal is mapped to G.709 asynchronously and the local reference frequency offset is −5 ppm, the asynchronously mapped G.709 signal would be 9.95328 Gbps−5 ppm. The 15 ppm frequency difference between the actual payload signal frequency (+10 ppm offset) and the payload envelope frequency (−5 ppm offset) is absorbed by the justification mechanism.

If the payload type is 10 GbE LAN PHY, the nominal payload frequency is 10.3125 Gbps with +/−100 ppm variation. The synchronously mapped G.709 signal would be 10.3125 times the F-OHR of 255/237 Gbps+/−100 ppm. The frequency offset is identical to the actual payload signal frequency offset. The asynchronously mapped G.709 signal would be 10.3125 times the F-OHR of 255/237 Gbps plus an offset related to the local reference frequency offset. The G.709 signal frequency with an OC192 payload type is very different from the G.709 signal with a 10GbE payload type.

It is also known in the art to convert incoming asynchronous data signals with either a higher or lower frequency than a synchronized data signal frequency by means of negative or positive bit stuffing so that frequency differences are made up, respectively, by the insertion into or removal from of spare bits or bytes in the synchronized data signal. See, for example, U.S. patent application of Rude, Publication No. 2001/0022826, published Sep. 20, 2001, now U.S. Pat. No. 6,415,006. Further, see also U.S. Pat. No. 5,757, 871.

The object of this invention is to provide a plesiochronous clocking system approach that provides for the efficient transport of different client signal protocols, such as in the case of G.709 protocol or 10 GbE protocol, while rendering the network system easily compatible with all protocols and standards.

SUMMARY OF THE INVENTION

According to this invention, the OTN transport frames are modified to permit an asynchronous transmission network that has a single line frequency or rate between end terminals and intermediate nodes or between intermediate nodes of the network (collective referred to as between node elements) wherein the digitally wrapped signal frequency is equal to the payload frequency times a variable overhead ratio (V-OHR) which ratio varies with the client signal payload type.

The optical transmission network of this invention is inherently asynchronous due to the utilization of a variable overhead ratio (V-OHR). The network architecture makes extensive use of OEO regeneration, i.e., deals with any electronic reconditioning to correct for transmission impairments, such as, for example, FEC encoding, decoding and re-encoding, signal reshaping, retiming as well as signal regeneration. The optical transmission network includes a plesiochronous clocking system with intermediate nodes designed to operate asynchronously with a single local frequency clock without complicated network synchronization schemes employing high cost clocking devices such as phase locked loop (PLL) control with crystal oscillators and other expensive system components. The asynchronous network operation provides for asynchronous remapping or remapping of any client signal utilizing any type of transmission protocol where the line side frequency is always the same frequency for the payload signal and the local frequency at a terminal or intermediate node is set to a local reference clock in accordance with the payload type and its overhead ratio (OHR), i.e., the overhead ratio is varied to meet the desired difference between the line rate or frequency and the client signal payload rate for the client signal payload type. The network operation of this invention can, therefore, receive and process many different, as well as future, payload types. As an example, the payload type may be either OC192 or 10GE but their respective line rates or frequencies over the transmission fiber will always be the same an identical line rate. In this manner, there is no second guessing (trial and error) or initial determination of what the line rate might be in order to determine what the frequency of local clock at an intermediate node to be the same as the original payload frequency. This asynchronous mapping and remapping scheme of this invention allows the elimination of otherwise necessary and expense system components, such as crystal oscillators or phase lock loop (PLL) controls at intermediate nodes, thereby significantly reducing the overall costs in the manufacture of these optical network systems.

Thus, a first feature of this invention is an asynchronous optical transport network (AOTN) based in part upon the ITU-T's G.709 Interface for the Optical Transport Network (OTN) standard that makes use of Optical-Electronic-Optical (OEO) conversions at terminal or intermediate nodes but where the nodes operate inherently asynchronously with respect to each other without complicated and costly network clock synchronization schemes such as expense PLL controls. The asynchronous network operation in the AOTN may be accomplished by having a line side operation at a constant rate throughout the network but a different local clock rate at an intermediate node, for example, which local rate is dependent upon the payload or client signal type. The difference in the line baud rate and the local clock rate are accommodated through asynchronously remapping of the client signal (via the Optical channel Payload Unit (OPUk) Payload, OPUk Overhead and the Optical channel Data Unit (ODUk) Overhead of G.709, for example) at intermediate nodes.

Basically, the OTN employs high cost clocking devices within nodes such as phase locked loop (PLL) controllers with crystal oscillators or other expensive system components, whereas the asynchronous mapping and remapping in the AOTN allows the elimination of these otherwise necessary and expensive system components thereby significantly reducing the overall costs in the manufacture of optical transmission networks, network systems and nodes. Disclosed is the method and apparatus for the handling of client payload and G.709 overhead in different time domains in a terminal or intermediate node where payload and overhead to and from the terminal or intermediate node is at a first frequency and the payload or overhead is handled at the terminal or intermediate node at a second frequency. Time differences in the frame structure due to different operational frequencies is handle via specified bytes in the frame structure, such as the ODUk Overhead and OPUk Overhead, via write to and read from a buffer between receiver and transmitter overhead processors, e.g., a FIFO buffer. The system architecture can easily handle a multitude of different client signal protocols, such as, for example, but not limited to OC192, OC48, OC 678, 10GE LAN or 10GFC and any other protocols that come along in the future. The reason the architecture can handle unknown future protocols is that the transmission of the signal is always accomplished at the same line rate. The logic circuitry at any intervening or intermediate node need only have offset information relating to the overhead ratio (OHR), which is a variable ratio depending on the client signal payload type, between the original client signal line rate and what we call the effective payload rate. The effective payload rate is defined as the signal line rate over the overhead ration (OHR). In the case of the G.709 standard, the OHR remains at all times fixed. In the present invention, the OHR varies as the client signal type changes (different signal formats and protocols) so that the line rate remains fixed at all times. Where different signal formats or protocols are handled in the same network intermediate node, for example, such a G.709 signals and SONET signals on the same channel, it would be necessary to have two different PLL clocking circuits in the signal path to accommodate the different signal frequencies. With the deployment of the asynchronous clocking system of this invention, such circuits are not required. Separate free running clock can be deployed for handling different client signal types and protocols in an asynchronous manner at the intermediate node.

A second feature of this invention is the enhanced distribution of the forward error correction (FEC) coding along the client signal frame payload in each row of the payload thereby reducing the required size necessary for the FIFO buffer in the logic circuitry.

This invention permits the deployment of free running clocks in subsystem circuitry at an intermediate or terminal node rather than utilizing PLL circuitry employing crystal oscillators, which are a necessity for synchronous clock operation required in the OTN and the present G.709 protocol, thereby reducing system costs. Also, by using local clocks, all signal jitter accumulation is eliminated at each intermediate node since the signal is regenerated at each node, according the basic architecture using PIC chip technology and what we call the "digital optical network" as disclosed and described in U.S. patent application Ser. No. 10/267,212, filed Oct. 8, 2002, which patent application is incorporated herein in its entirety by reference thereto. The client payload signals are regenerated at each intermediate node and, in addition, are FEC encoded/decoded at each node too. Thus, there is no accumulated phase noise (jitter) or signal error from one intermediate node to the next.

It should be noted that this invention may be employed in any synchronously operated optical transmission network where asynchronous operation is desired for either the overhead signal type or the payload signal type, or both. Therefore, this invention has additional utilities and applications beyond the utility disclosed here in conjunction with SONET and OTN.

Other objects and attainments together with a fuller understanding of the invention will become apparent and appreciated by referring to the following description and claims taken in conjunction with the accompanying drawings. The drawings are not necessarily to scale so that emphasis instead is placed on the principals and features of the invention.

BRIEF DESCRIPTION OF THE DRAWINGS

In the drawings where like reference symbols refer to like parts or elements.

DETAILED DESCRIPTION OF THE INVENTION

Reference is initially made to what is called a digital optical network which is described in U.S. patent application Ser. No. 10/267,212, filed Oct. 8, 2002, entitled, DIGITAL OPTICAL NETWORK ARCHITECTURE, which is owned by the assignee herein and is incorporated herein by its reference. Such a network is inherently asynchronous, and makes extensive use of OEO conversions at signal regeneration nodes in the network to provide "3R" functionality which deals with any electronic signal reconditioning to correct for transmission impairments as well as 3R processing, such as, for example, but not limited to, FEC encoding, decoding and re-encoding, in addition to signal re-amplification (1R), signal reshaping (2R) and signal retiming (3R). In both of these respects (i.e., asynchronous operation and signal reconditioning), this network architecture partially runs counter to key architectural principles embodied in the ITU-T OTN architecture in general, and to the G.709 standard layering hierarchy in particular. In order to understand the application of this invention, it is important to understand digital wrapping as set forth in the current proposed draft for the G.709 protocol. The draft ITU-T Recommendation G.709 is part of a larger international standards effort, which proposes an optical transport network (OTN) architecture intended to converge existing packet (ATM, IP and Ethernet) and TDM (SONET and SDH) broadband services, transparently and via the shortest possible physical stack, onto a single network, while providing enhanced amplification and networking functionality to all client services. While some background detail of the OTN payload frame is provided in the description of several figures, further detail is provided in "ITU-TG.709 Interface for Optical Transport network (OTN)", (www.itu.int/ITU-T), which is incorporated herein in its entirety by reference thereto.

A principal aim of OTN architecture is to enable multiple service transport of packet based data and legacy traffic. The digital wrapper overhead structure accommodates management and monitoring of each optical channel wavelength. Thus, the wrapper overhead (OH) makes it possible to manage and control client signal information with the addition of OH at several overhead sections of the OH portion of the OTN frame constituting the client signal. Like SONET, the OTN architecture in G.709 assumes that the transport function through the network is synchronous in the digital domain. Frames received at the ingress of a G.709 network node are assumed to be re-transmitted at the node egress at an identical frame rate. Rate adaptation between the network and the client signal is performed only at the network edge, such as at end terminals at client tributary interfaces. The key OTN concepts are the Optical Transport Module (OTM) which includes the Optical Channel (OCh), and the digital wrapper frame structure including three sets of overhead (OH) information.

Figure 1:
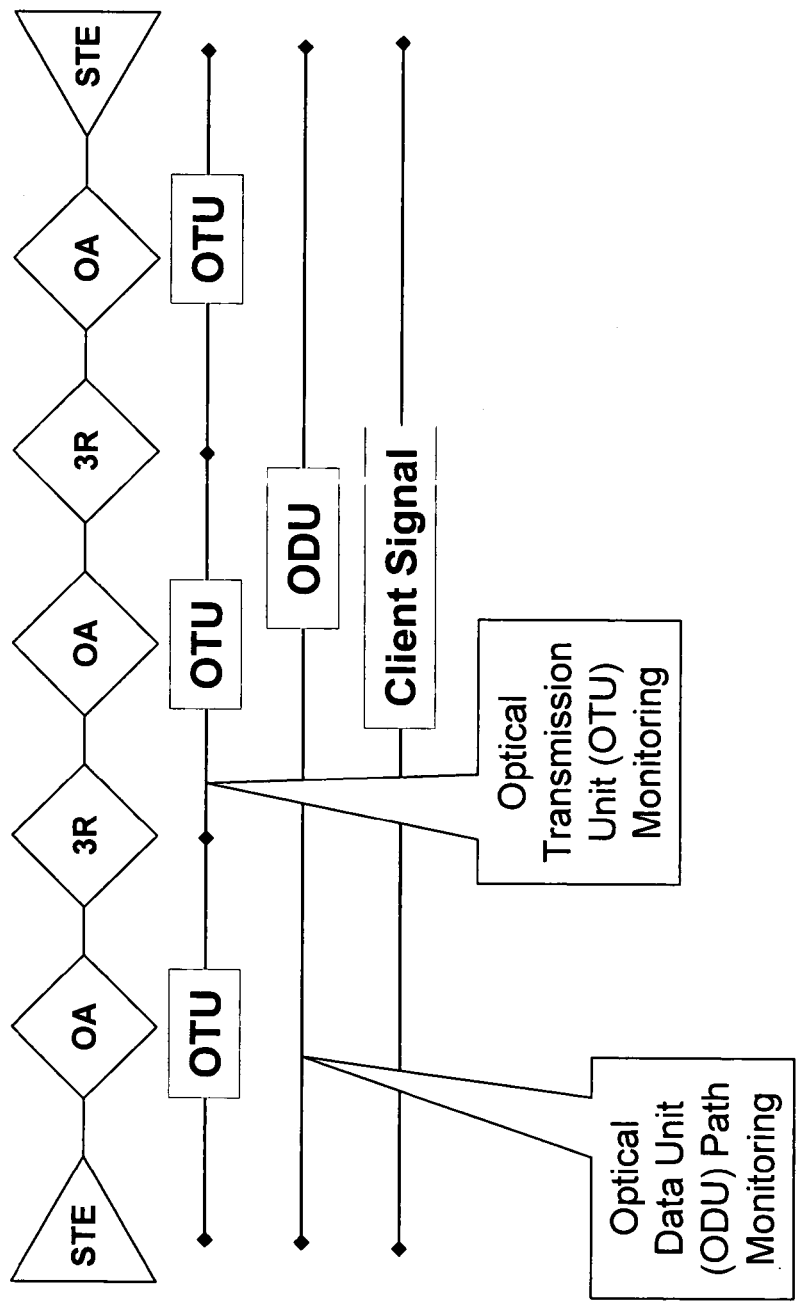
FIG. 1 is a high level schematic view of a 3R optical transmission network.

To begin with this explanation, reference is made to FIG. 1 which shows a portion of G.709 networking where the client signal to be transmitted, for example, between two end terminals, STE, in an optical path or link which may include optical amplifier (OA) nodes and signal regeneration (3R) nodes. The span in the optical link between 3R intermediate nodes in the G.709 protocol is called the optical channel transport unit (OTU) and the end-to-end link, such as between end terminals, is called the optical data unit (ODU). The OTU is generated for each span or hop while the ODU is generated at the ingress and egress points of the client signal as indicated in FIG. 1. Thus, there may be several OTU paths (three in FIG. 1) within an ODU path.

Figure 2:
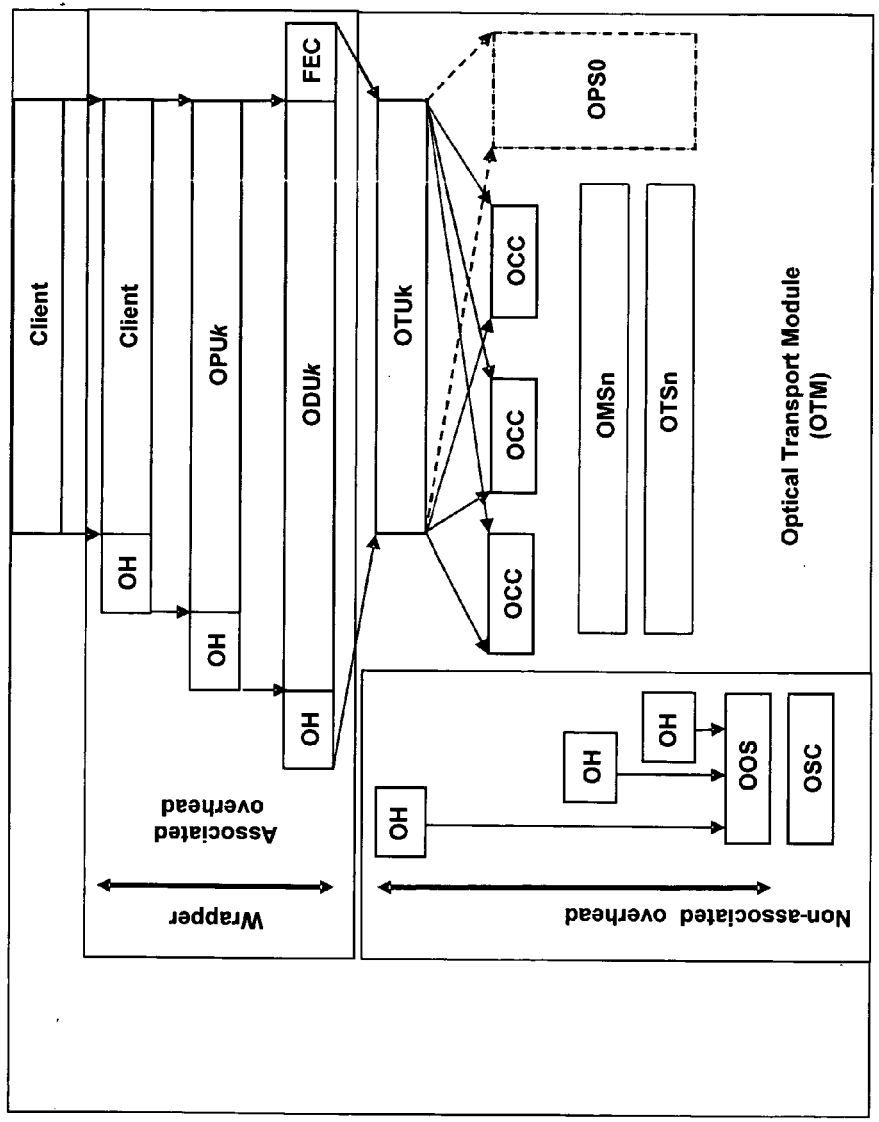
FIG. 2 is a schematic diagram of the G.709 Optical Transport Module (OTM).

Reference is now made to FIG. 2. The purpose of OTN is to enable multi-service transport of packet-based data as well as legacy traffic. The OTN digital wrapper accommodates non-intrusive management and monitoring of each optical channel signal. The wrapped overhead (OH) therefore makes it possible to manage and control client signal information. An OTM-n structure supports n optical channels on a single optical span. Services such as 3R regeneration and termination of the OTUk frames and overhead may be provided at each end. This enables supervision and maintenance of the OTM interfaces at each location. As shown in FIG. 2 in the optical transport module (OTM), the OTN management capabilities are achieved through the deployment of several layers in the transport of the client signals together with associated overhead. These layers in more detail include the client unit or layer, the optical channel payload unit or layer (OPUk) and the optical channel data unit or layer (ODUk) together with associated overhead (OH). The ODUk includes, in addition, the forward error correction (FEC) coding section.

Thus, the OTN frame consists of the overhead (OH) section, the payload section and the FEC section, which may be a Reed-Solomon RS (255,239) code which enables the correction of n symbol errors in the payload. As shown in FIG. 2, the OH section and the FEC section of each frame are added to the optical transport unit (OTU). This is then carried for each channel signal (OCh) so that for each optical channel, additional OH must be added to handle additional signal management functionality for the OTN. The Optical Multiplexing Section (OMS) and the Optical Transmission Section (OTS) are put together using the additional OH together with the OCh (OTUk).

Thus, G.709 protocol makes use of the OTNs Optical Channel (OCh) layer, which allows STM-N, IP, ATM and Ethernet signals to be digitally mapped (wrapped) into frames, adapted to a constant bit rate, and then digitally multiplexed. The OCh is then mapped onto an Optical Channel Carrier (OCC), which is a channel wavelength. G.709 protocol specifies standard client-independent in-band overhead for "λ" and "multi-λ" signals, and defines separate "non-associated" or "out-of-channel" signals to be carried out-of-band between network elements (NEs).

OChs (or OCCs) can be optically multiplexed together to create an Optical Multiplex Section (OMS), such as an optical channel group (OCG) or band in the optical transport system. An OMS may be transported over a span of fiber optic cable that constitutes the Optical Transmission Section (OTS), along with an optional Optical Supervisory Channel (OSC). The OTM Overhead Signal (OOS) is carried by the OSC over the OTS, and contains OTS, OMS and OCh (i.e., non-associated) overhead and general management communications.

Within an OCh, the client digital signal is first "wrapped" in an OCh Payload Unit (OPUk) frame. The OPUk framing level provides rate adaptation of the client signal to a constant bit-rate k, where k=1, 2 or 3 which is, respectively, ~2.5, ~10 or ~40 Gbps (specifically 2.66 Gbps, 10.7 Gbps and 43 Gbps, respectively). The overhead associated with the OPUk (OPU-OH) identifies the payload type to the final adaptation layer devices, and provides other client-specific adaptation functions between path ends. The OPUk, including its overhead, for frame X is parity-checked, and the resulting BIP-8 value is inserted into the OTU or ODU overhead (OH) for frame X+2.

The OPUk frames are next "wrapped" in an OCh Data Unit (ODUk) frame with its associated overhead (ODU-OH). The ODUk provides path-layer connection monitoring functions, and the ODU-OH includes information for maintenance and operational functions to support the OChs. The ODUk OH consists of portions dedicated to the end-to-end ODUk path monitoring (PM) and to six levels of tandem connection monitoring (TCM), which may be nested or which may overlap. The ODUk path OH is terminated at each point that the ODUk frame is assembled and disassembled. The TCM OH is inserted and terminated at the source and sink of the tandem connection, respectively.

The digital ODUk frame is then FEC-encoded and wrapped in an OCh Transport Unit (OTUk) frame. The OTUk layer conditions the ODU for transport over an optical channel connection. It also provides error detection and correction, and section layer connection monitoring functions. As previously indicated, OTUk overhead also includes the Reed-Solomon RS (255,239) forward error correction (FEC) codes. The entire OTUk frame, except for the frame alignment signals (FAS and MFAS), is scrambled to insure sufficient bit-timing content.

Figure 3:
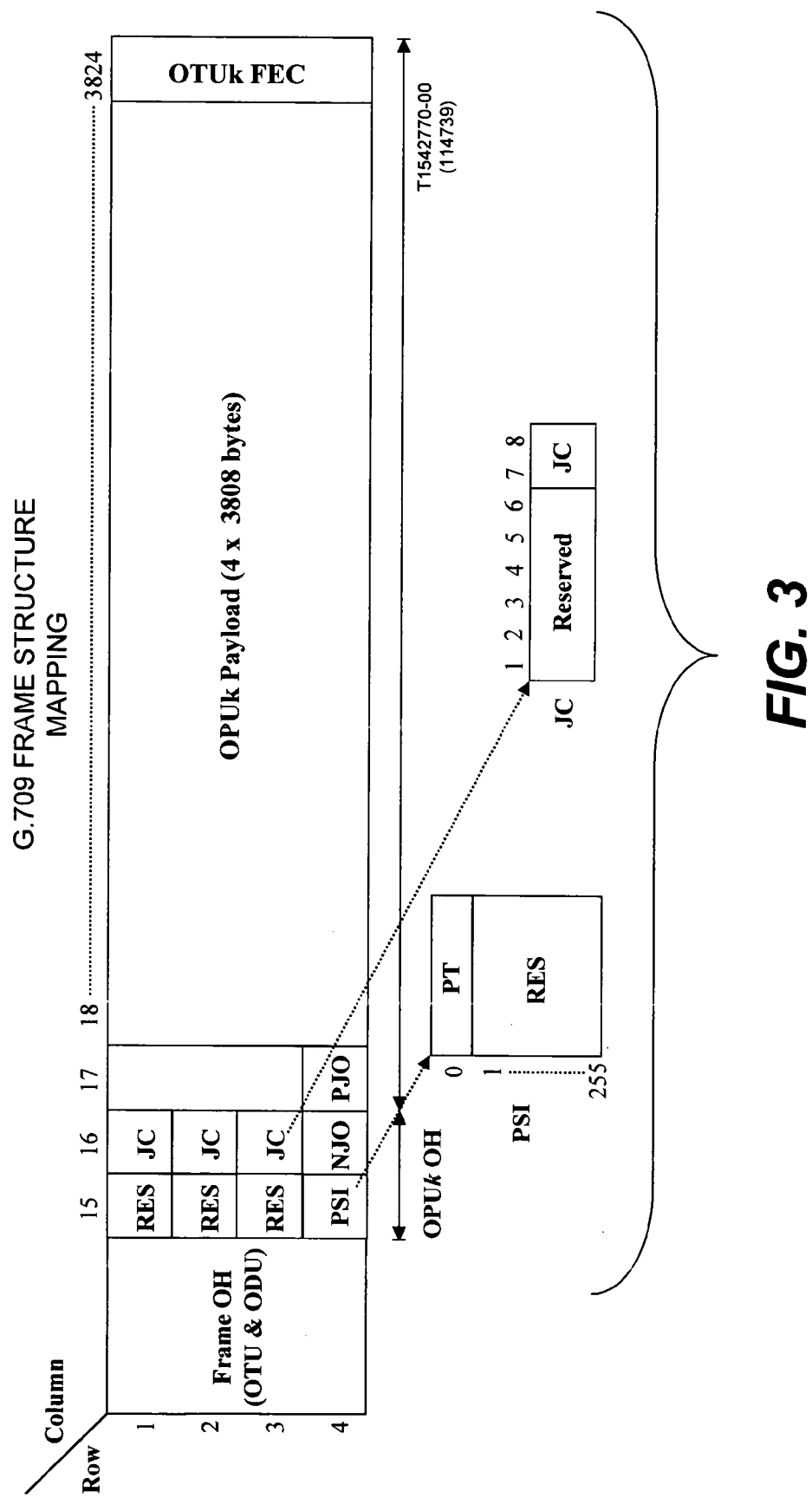
FIG. 3 is a schematic view of the G.709 frame structure.

Reference is now made to FIG. 3 which illustrates in more detail the G.7-709 frame structure. The overhead (OH) at the beginning of the frame consists of the OTU section, ODU section and the OPU section overhead. The former two sections will not be discussed here but what is of particular interest relative to this application is the OPU section. The client-specific OPU overhead for 10G constant bit rate signals (CBR10G), for example may be comprised of three Justification Control (JC) bytes, Negative Justification Opportunity (NJO) byte, and 3 bytes reserved for future international standardization (RES). The OPU payload for these mappings comprises 4×3808 bytes (4 rows by 3808 columns), including 1 additional byte of overhead, the Positive Justification Opportunity (PJO) byte, embedded in column 17 (row 4) of the payload. The asynchronous and bit synchronous mapping processes generate the JC, NJO and PJO bytes which are employed in a demapping process. Thus, the Justification Control (JC) signal, may be located in rows 1, 2 and 3 of column 16, bits 7 and 8, is used to control the two justification opportunity byte NJO in column 16, row 4 and PJO byte in column 17, row 4. The JC bytes consist of two bits for justification control and six bits reserved for future international standardization. In column 16, row 4 is the Payload Structure Identifier (PSI) which includes the Payload Type (PT) so that a network NE can identify the client signal payload type in order to determine the digitally wrapped signal frequency or line rate.

To be noted is the G.709 frame structure is divided into three main sections: frame overhead (OH) which comprises columns 1-16 by 4 rows (column 17, row 4 the PJO byte), the client signal payload which comprises columns 18-3824 (representing 3808 bytes per row for 4 rows), and the FEC coding comprising columns 3825-3840 by 4 rows. The data in a frame is sent and read out by the logic circuitry serially, row by row, from row 1 to row 4, for each frame. Thus, tucked between each row of payload is FEC coding plus frame OH, i.e., the FEC and OH are interleaved with the client payload. From this point of view, the FEC and OH can be said to be "coarse" distributed within and along a frame.

It is should be realized that the particular location of bytes in the frame OH is not fixed in the sense that they cannot be relocated to another location in a respective OH section, unless the requirements are to follow in detail the OTN standard. Thus, the OH bytes can be replaced elsewhere in the OH or even some in the payload (PL) according to the designer as long as the logic circuitry reading out locations in the OH has knowledge of the addressed locations for particular or designated OH data.

As indicated previously, in standard G.709 digital wrapper, the payload signal can be mapped into the digital wrapper in two ways, synchronous and asynchronous mapping. In synchronous mapping case, the digitally wrapped signal frequency is exactly equal to the incoming payload signal frequency plus a fixed overhead ratio (F-OHR). If the incoming payload signal frequency varies slightly, the digitally wrapped signal frequency will track that variation. In asynchronous mapping case, the digitally wrapped signal frequency is equal to the payload envelope frequency plus a fixed overhead ratio (F-OHR). The payload envelope frequency is generated by the wrapper and is not frequency locked to the incoming payload signal. The frequency difference between the payload envelope and the incoming payload signal is accommodated by the justification mechanism using the justification control (JC) information.

Figure 4:
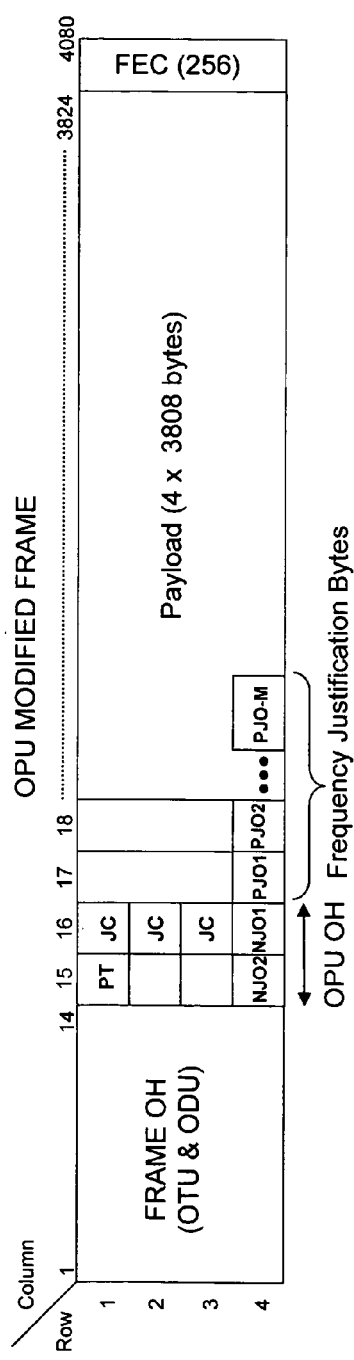
FIG. 4 is a schematic view of a modified G.709 frame structure utilized in connection with this invention.

Reference is now made to FIG. 4 which illustrates a modified digital wrapper frame according to this invention. The G.709 frame structure is particularly modified here relative to the frequency justification bytes. Additional NJO-N bytes are added as well as additional PJO-M bytes and are placed here in row 4 at columns 15 to into the payload as indicated in FIG. 4. N and M can be any integer but here N is shown as equal to 2. The additional justification bytes are added to compensate for frequency differences between the payload rate (such as, for example, 9.953 Gbps in OC192) and what we called the effective payload rate (such as, for example, 9.957 Gbps in OC192), which is part of the invention set forth herein. More will be said about the effective payload rate later on. The number, M, for the PJO and the number, N, for NJO are a sufficient number of bytes to represent the required compensation for the frequency difference between the actual payload rate and the effective payload rate, the latter of which is dependent upon the effective payload type, i.e., the magnitude of the difference, for OC192 for example, between the clock rate of the client payload signal of 9.953 Gbps and the effective payload signal of 9.957 Gbps. The magnitude of this difference in justification bytes is indicative of this frequency difference which can change from frame to frame since these different clocks can both vary ±20 ppm within the standard. More will be said about this later.

Figure 5:
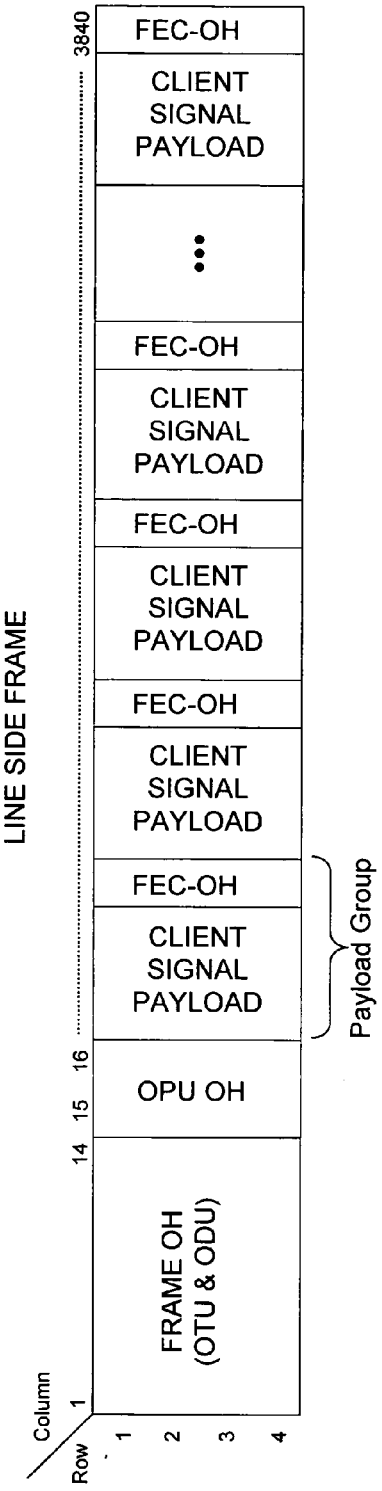
FIG. 5 is a schematic view of a line side frame structure utilized in client signals in connection with this invention.

As shown in FIG. 5, a significant difference between the line side digital wrapper frame of this invention and a line side digital wrapper frame (ODU digital wrapper frame of G.709) of the type shown in FIG. 3 is that in FIG. 3, the 256 bytes of the FEC coding is distributed at the end of each of the respective rows 1-4 of the payload, as previously indicated. On the other hand, in the line side frame structure of this invention, the FEC coding, and also the OH if desired, is distributed along each row of the payload envelope. Thus, the payload is, therefore, divided into a plurality of payload groups. Each payload group is of a predetermined byte (column) width. In each payload group, the client signal payload is a predetermined byte width as well as the FEC-OH which also has a predetermined byte width, with all such byte widths being the same for each payload group making up the frame payload. The logic circuitry can then read out each payload frame knowing the start and stop point of each client signal payload and of each FEC-OH in each payload group. In reading out the payload bytes, for example, the FEC-OH bytes can be easily skipped along the payload. The number of payload groups in any frame payload may vary from one to several such groups. The upper limit is where the frequency of such groups in the payload may over burden the logic circuitry, for example. The reason for such a further and "finer" (as compared to "coarse" mentioned earlier in the description) distribution of the FEC code in the payload will become more evident later on, but it is suffice to say now that if the payload is to be read out of the frame with skipping of the FEC-OH sections to accommodate and render the logic circuitry less costly with minimum circuit latency.

It is of interest to note that the justification bytes, PJO-Ms, adjust for the frequency offset between the effective payload rate and the actual client signal payload rate whereas the NSB1 and NSB2 values in Table 1 provide the number of skipped bytes that need to be distributed over each client signal payload frame to adjust for the difference between the effective payload envelope size and the actual client signal payload envelope size according to the payload type. Thus, Table 1 indicates values, via NSB1 and NSB2, relative to how many unused payload bytes are required to be skipped in each payload frame.

Also, as indicated above, the deployment of finer distribution of FEC, overhead (OH), if desired as well as stuffed bytes throughout the payload envelope permits a smaller size buffer in the logic circuitry because the latency of the buffer will correspondingly be smaller because of this skipped byte distribution.

Figure 6:
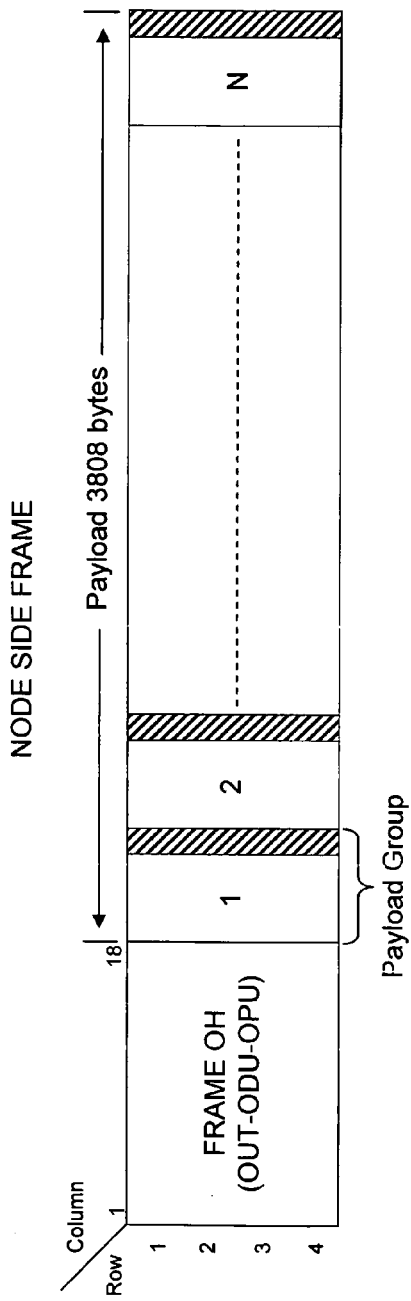
FIG. 6 is schematic view of a node side frame structure utilized in connection with this invention.
Figure 6A:
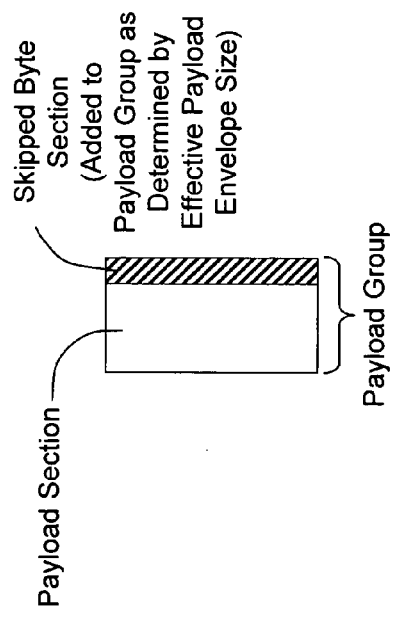
FIG. 6A is a detail of one of the payload groups in the node side frame shown in FIG. 6.

Reference is now made to FIG. 6 which shows another modified digital wrapper frame according to this invention. Note that FIG. 5 relates to the line side digital wrapper frame (modified ODU digital wrapper frame of G.709) where the frame structure is utilized between node elements (NEs) whereas the node side digital wrapper frame (modified OPU digital wrapper frame of G.709) of FIG. 6 is utilized in an intermediate node as will become more evident later on in connection with the architecture at an intermediate node in the network span. Shown here is that the payload envelope is divided up into N payload groups each such group having the same number of bytes and comprising a payload section and a skipped (stuffed or dummy) byte section. A payload group is detailed in FIG. 6A. The number of skipped bytes to add with each payload section is determined from the client signal payload type and the use of a lookup table provided in the software or firmware associated with the logic circuitry at an intermediate node. Such a lookup table is illustrated in Table 1 below. There are to columns in the lookup table devoted to what are called nominally stuffed bytes (NSB) and there are two types of NSBs, NSB1 and MSB2. In these particular columns in Table 1, NSB1 sets forth the number of skipped bytes that should be provided in N−1 payload groups of the frame and NSB2 sets forth the number of skipped bytes to be provided in the last payload group, N, which fundamentally comprises a remainder of the total skipped bytes to be stuffed. Thus, for N−1 groups, the skipped section of N−1 payload groups will have the same amount of stuffed bytes while the last N payload group may have more than or less than the total stuffed bytes in the other payload groups. For example, for OC192, the payload is 3808 bytes per row and the effective payload bytes for OC192 are 3660 bytes per row, a difference of 148 bytes, which is the total of skipped bytes in a node side frame. Thus, the effective payload rate, due to skipped bytes, is 9.957 Gbps, which naturally is higher than the OC192 payload rate of 9.953 Gbps. As seen in lookup Table 1, NSB1 is 8 bytes and NSB2 is 28 bytes for OC192. For OC192, if N is equal to 16, then in the first 15 payload groups, 8 bytes are stuffed for the skipped byte section of each of groups 1-15 (total equal to 8×15 or 120) and for the N=16 payload group, 28 bytes are stuffed in this last payload group, making a total of skipped bytes of 148 bytes (120+28), i.e., the total of skipped bytes mentioned above for OC192.

TABLE 1

| Client Signal | Client Payload Rate | Encapsulated Payload Rate | Payload Envelope | Effective Payload Rate | Rate Offset (ppm) | NSB1 | NSB2 |
|---|---|---|---|---|---|---|---|
| OC192 | ~9.953 | 10.36 | 3660 | ~9.5733 | 409.2 | 8 | 28 |
| 10GbE | ~10.312 | 10.36 | 3792 | ~10.316 | 385.0 | 0 | 16 |
| OC48 | ~2.488 | 2.59 | 3660 | ~2.489 | 409.2 | 8 | 28 |

Thus, in summary, a predetermined number of payload column bytes are taken out of each payload envelope via byte stuffing reducing the effective payload envelope size available for the client signal payload where the number bytes so removed is based upon the client signal payload type. The number of such bytes in effect removed from the payload is accomplished by designating such bytes as skipped bytes in the payload envelope. Then, the client signal payload is divided into N payload groups where each such group has a payload section and a skipped byte section. Such as payload envelope is called an effective payload envelope.

From the above description, it should be understood that the effective payload rate will always be higher than the particular client signal payload rate for a given payload type because of byte stuffing which bytes are ignored by the logic circuitry. Therefore, there is always a difference in frequency or rate between the client signal payload rate and the effective payload rate. This frequency difference is kept track off via the NJO-N and PJO-M bytes in the payload frame of FIG. 4. As an example in Table 1 for OC192, it can be seen that this PJO positive adjustment difference is shown as a rate offset of ~409.206 in ppm as represented by bytes PJO-1 to PJO-M. Also, it should be understood that the width of the payload groups can vary depending upon either, or both, of how many bytes are to be included in the payload section of each group and how many bytes are to be included in the skipped byte section, which, as per Table 1, is dependent upon the effective payload type, such as OC192 (3660 bytes), 10GE (3790 bytes) and OC48 (3660 bytes).

At this point, there may be realized an issue as to why the effective payload size and rate are a necessity since the client signal rate can be easily discerned from the PT byte overhead for any incoming client signal to an intermediate node in the network, particularly where the node is a regeneration node. The signal can then be clocked through the node at the actual payload rate. However, the essence of this network system is to operate all line sides of the network (i.e., the signal path propagation between node elements) at the same frequency or rate. In order to do that for any client signal type or payload type for different protocols and standards, the overhead ratio (OHR) cannot remain fixed as in the case of the G.709 standard. Therefore, the present invention provides for a variable overhead ratio (V-OHR) that changes in accordance with the client signal payload type being received from the line side into a node side with the line rate always remaining a fixed frequency.

The effective payload envelope is smaller than the payload envelope size which is fixed by operating at a constant higher line rate or frequency. The bandwidth at the line frequency is too much to carry a payload type such as OC192 which has a smaller payload. In the case of OC192 client signals, the effective payload size is 3660 columns per frame. So, in order to achieve the lower payload size and a corresponding lower effective payload rate as compared to the line rate, skipped bytes are inserted into the payload frame as depicted in FIG. 6. Skipped bytes can also be referred to as stuffed bytes or dummy bytes. Sections of such stuffed bytes are distributed along the payload and the amount of the stuffed bytes so distributed depends on the client signal payload type, such OC48, OC192 or 10GE, for example. In this sense, the size of the skipped bytes sections distributed along the payload will vary from one payload type to another payload type and the logic circuitry readout of the payload bytes is programmed, with the use of a frame column counter, to know where the a payload section in each payload group in a payload frame begins and ends depending on the client signal payload type. These skipped byte sections of payload groups making up the effective payload envelope are ignored by the logic circuitry reading out the payload frames. The difference between the effective payload rate and the actual client signal payload rate is kept track of by means of the justification bytes (PJO-M) where M is an integer. The number of PJO-Ms utilized depends upon the magnitude of difference between the effective payload rate and the actual client signal payload rate.

The effective payload rate (EPR) is equal to fixed line rate (LR) over the V-OHR or, $$EPR = \frac{LR}{OHR}. \tag{1}$$

The OHR may be determined as follows:

$$OHR = \frac{\text{Client Frame Size}}{\text{Client Payload Size} - \text{Payload Offset Size}}. \tag{2}$$

The effective payload clock is derived at an intermediate node via the logic circuitry and a local reference clock, which is not a crystal oscillator. At the intermediate node, the payload type is derived from the incoming client signal payload type via the PT byte and from Table 1, the client payload size as well as the offset size (NSB1 and NSB2) can be derived as well as the effective payload rate. The client signal is received at the node at the line rate and is clocked through the node via the client payload rate which is derived from the OH via the justification bytes (PJO-M), which is the frequency difference between the effective payload rate, also from Table 1, and the known actual payload rate (k) or, Client Payload Rate=Effective Payload Rate+Frequency Justification(PJO–M) (3)

As a specific example, OC194 has a client signal rate of about 9.953 Gbps and an encapsulated payload rate of 10.36

Gbps. The line rate we choose, which is constant, is 11.1, i.e., higher than the effective signal rate of about 9.957 Gbps, the client signal rate of 9.953 Gbps. The V-OHR has to variable in order to maintain a constant line rate of 11.1 Gbps. The effective payload rate determines the resultant OHR where the line rate is constant. So, according to Formula (2) above, the client frame size for OC192 is 4080, the client payload size is 3808 for OC192 and the payload offset size from Table 1, where N is made equal to 16 is (NSB1+NSB2) or ((N-1)×8+28) or (15×8+28) which is equal to 148. The effective payload size is 3660 bytes for OC192 (see Table 1) which is client payload size of 3808 minus the offset of 148. Therefore, OHR is 4080 divided by 3660.

It should be understood that, in essence, the effective payload rate is a mechanism by which the payload clock of 9.953 Gbps can be derived at a node knowing the given constant line rate and the frequency justification bytes in parts per million (ppm) which are also indicated in Table 1 for different types of client signals. Since the effective payload size is a smaller number (or the effective payload rate is a higher rate), the skipped bytes are distributed along the client payload of 3808 bytes, in the case of OC192. Where N is made equal to 16 in the example above, as seen in FIG. 6, each payload group to N−1 would contain 238 payload bytes and 8 stuffed or dummy bytes for a total of 246 payload group bytes. In the case of the last N payload group, which is payload number 16, this payload group would contain 238 payload bytes and 28 stuffed or dummy bytes for a total of 266 bytes. It will be understood by those skilled in the art that N can be made any number, starting with N=1, within reason, of course, because too many payload groups distributed within the client signal payload can be more of a burden than an aid. Alternatively, the payload groups could be of uneven or nonuniform size as long as the logic circuitry, through its counter, has knowledge of the byte positions as to where each payload byte section in the frame begins and ends and where the accompanying skipped byte sections begin and end relative to each payload group. Further, the distribution of the frame payload groups along the frame payload can be nonuniform, again, as long as the logic circuitry, through its counter, has knowledge of the byte positions as to where each payload byte section in the frame begins and ends and where the accompanying skipped byte sections begin and end relative to each payload group. Obviously, the easiest approach from a logic circuit and circuit counter point of view is to have payload groups uniformly distributed along the frame payload envelope.

Figure 7:
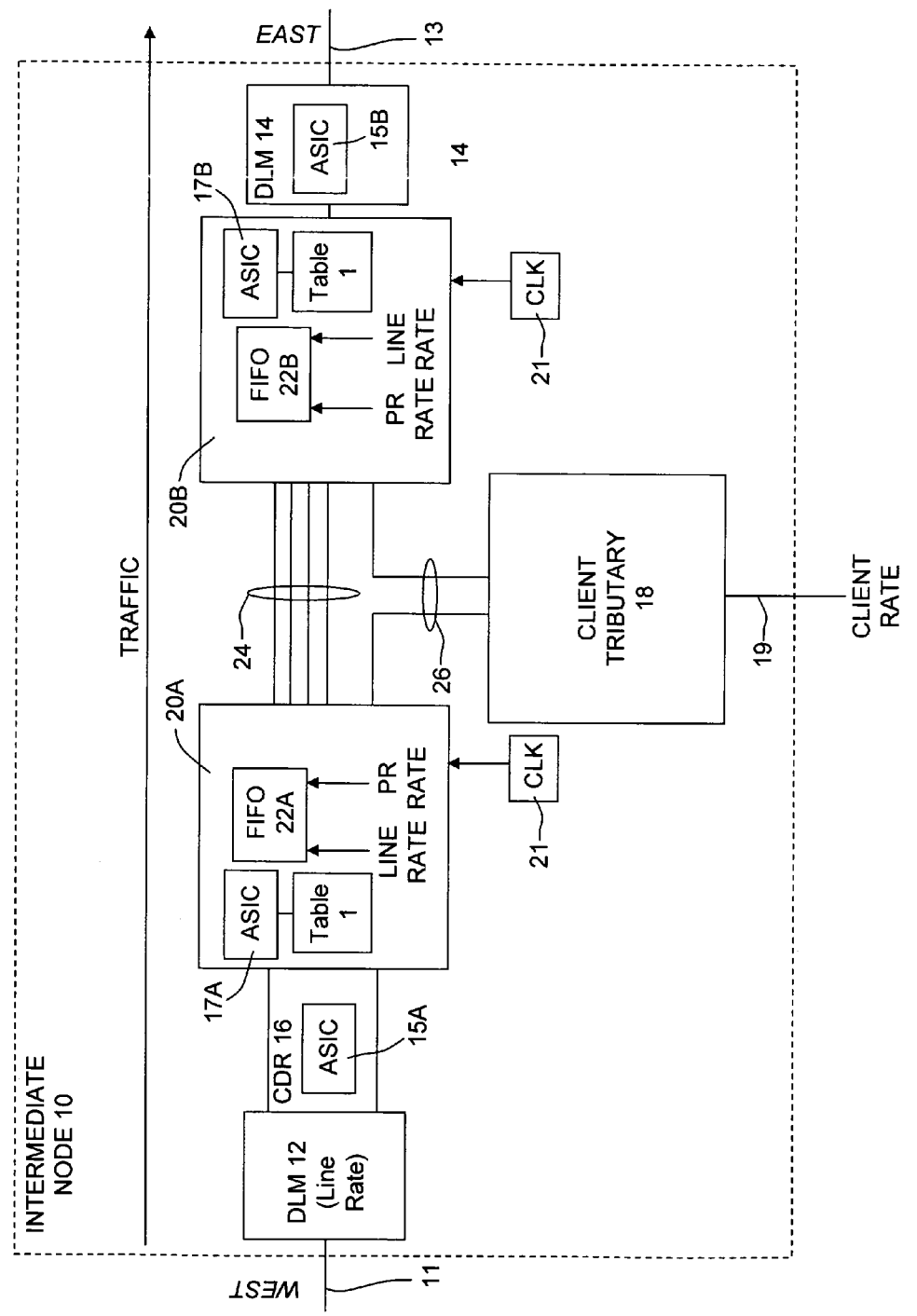
FIG. 7 is a schematic view of an intermediate node in a transmission network utilizing this invention.

Reference is now made to FIG. 7 which schematically shows a high level representation of an intermediate node 10. As seen in FIG. 7, for simplicity, only client payload traffic from west to east is illustrated. However, in the normal situation, client payload traffic is bidirectional. As shown in FIG. 7, node 10 includes a digital line module 12 to receive the client signal from the line side 11 for conversion from the optical domain into the electrical domain and the clock and data recovery circuit 16 where the data signals are recovered under the line clock rate via ASIC logic 15A. Also, FEC decoding is applied to retrieve an accurate representation of an electrical representation of the client signal. In this case, ASIC chip 15A provides for decoding the FEC and OH in the client signal line side frames (FIG. 4) of the client signal for use in recovery of the client payload envelope. The recovered client signal with its signal node frames (FIG. 5) then comes into signal processing unit 20A where the signals are received and processed via ASIC chip 17A, among other processing components, recover the payload signal, generate the effective payload rate to recover the original payload clock with reference to Table 1 and the client signal justification bytes NJO-M to recover the frequency difference between the effective payload rate and the client signal payload rate. Also, since the line rate is faster than the client signal payload rate, a buffer must be employed in converting the client signal from the line rate to the client payload rate. Such a buffer, for example, may be a FIFO or a delay line. Shown here is the deployment of a FIFO 22A for this purpose. Processing unit 20A also include a local reference clock 21 from which the payload clock rate may be derived through the effective payload rate (EPR) and the deployment of lookup table 1 as previously explained.

As shown in FIG. 7, data at the faster line rate is clocked into FIFO 22 and clock out at the slower client payload rate. Node 10 is illustrated as an ADD/DROP node and the recovered client signal at its proper payload rate may be directed via lines 26 to client tributary 18 for forwarding to a client terminal at 19 at the client signal rate. Node 10 also provides for pass-through of client signals to processor unit 20B where the client signal, after having been regenerated (3R), is clocked through FIFO 22B from the slower client rate back into higher line rate, and the client payload reassembled with payload groups and skipped bytes to achieve the effective payload envelope (FIG. 6) via ASIC logic 17B and then passed onto DLM 14 where the line side envelope (FIG. 5) is generated via ASIC logic 15B so that the payload includes required FEC encoding and OH. Then, DLM 14 provides for conversion of the client signals from the electrical domain into the optical domain at the higher line rate on the east output line 13. By the same token a client signal from client tributary 18 via lines 26 may be received by processing unit 20B where the proper node side signal frames and then the proper line side signal frames are created via logic 17B and 15B and data in lookup Table 1 for the particular client signal payload envelope.

As previously indicated, an important feature of this invention over what has been previously done before is that the constant higher or faster line rate in the signal transmission network is independent of the client signal payload rate and also the input clock rate on the ingress side of a DLM buffer at a node element. The output clock rate on the ingress side of a DLM buffer at a node element will be changed by a local reference clock to the actual payload rate according to the particular client signal payload type making ingress at the node element. On the egress side of a DLM buffer at the node, the opposite rate change will be encountered.

A specific example of a client signal for passage through node 10 may be, for example, an OC192 client signal as per Table 1. The chosen higher line rate which is constant from one network element (NE) to another is 11.1 Gbps. For example, the client payload envelope size is 3808 with a payload rate of approximately 9.953 Gbps. To achieve the proper OHR for this line rate, the effective payload rate must be 9.957 Gbps so that the payload envelop will have to be reduce to an effective payload envelope size of 3660 bytes (4 rows per frame). Thus, as seen in FIG. 6, skipped bytes are inserted into a plurality of payload groups which are ignored by the ASIC logic circuitry. As previously indicated, where N=16 (see Table 1 and NSB1 and NSB2), each payload group from 1 to 15 will carry 8 dummy or stuffed bytes and payload group 16 will carry 28 dummy or stuffed bytes for a total of 148 (3803-3660). Other values for N can be chosen.

The asynchronous network operation of the optical transmission network in this disclosure may also be utilized for transporting other types of client signal protocols. Two additional examples are provided in Table 1 beside OC192. For example, 10 GbE protocol data in an asynchronous fashion by may be mapping or remapping in intermediate node 10 into the modified G.709 frame structures shown in FIGS. 4-6. This asynchronous mapping and remapping allows the elimination of otherwise necessary and expensive clocking devices within these nodes, such as phase locked loop (PLL) controllers with crystal oscillators, thereby significantly reducing the overall costs in the manufacture of optical transmission networks, systems and their node elements (NEs).

It should be noted, as in the case of the OC 192 payload, that since the Ethernet payload is also accommodated in accordance with this invention, the PJO bytes extend into the client payload such as into column 17 and 18, and beyond, in row 4, which are part of the client payload from column 17 to column 3824 of Ethernet payload envelope. While the scheme here includes opportunity bytes extending into the client payload, other possible configuration for stuffing skipped bytes in the Ethernet payload frame are readily ascertainable by those skilled in the art.

Figure 8:
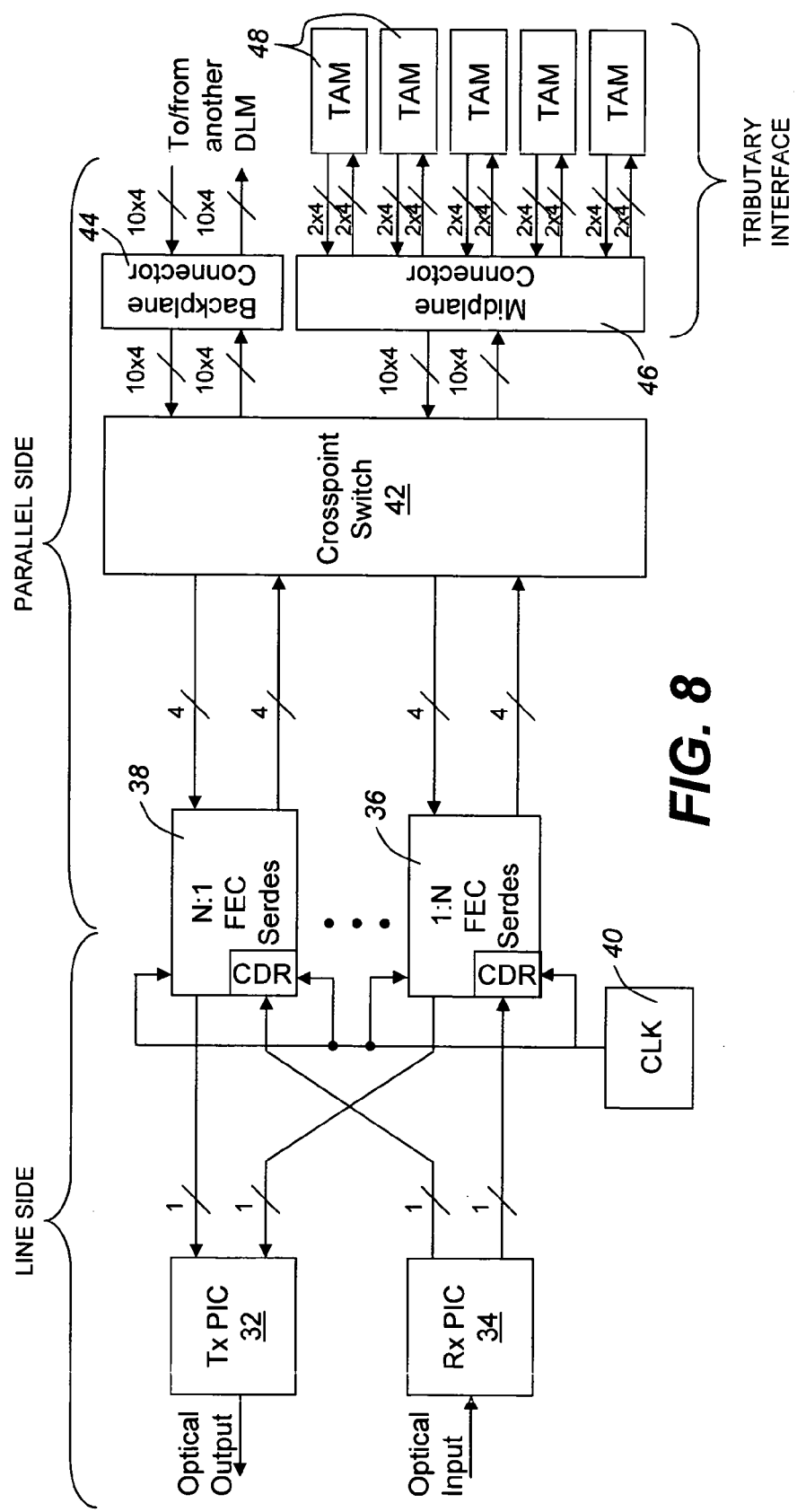
FIG. 8 is a block circuit diagram of a digital line module (DLM) that may be employed in the practice of this invention.

Reference is now made to FIG. 8 which illustrates in more detail the circuitry at an intermediate node of the type generally shown in FIG. 7 such as may be found between end terminals, STE, of FIG. 1. At these nodes, signal regeneration and FEC decoding and re-encoding are carried out at terminal points of each OTU path. Some optical amplifier (OA) nodes may be included in the link path but, for the most part, in any OTU path, there is not only signal regeneration but also signal error correction. This invention and its accompanying disclosure provides for both signal error correction at each node as well as signal regeneration at each node while reducing system costs in a network that operates, in principal, as an optical transmission network that is inherently asynchronous.

FIG. 8 illustrates in more detail a digital line module (DLM), such as DLMs 12 or 14 in FIG. 7, for receiving and sending serial optical data in the optical domain after passing through as parallel data in the electrical or electronic domain. In FIG. 8, a transmitter photonic integrated circuit (TxPIC) chip 32 provides for transmitting multiplexed optical channel signals as an optical output onto the line side and a receiver photonic integrated circuit (RxPIC) chip 34 provides for receiving multiplexed optical channel signals from the line side. Only two signal channels are illustrated for each PIC for the purposes of simplicity. However, more than two optical channels are generally present on each PIC, such as, for example, ten (10) optical transmitter signal channels integrated in TxPIC chip 32 and ten (10) receiver signal channels integrated in the RxPIC chip 34. TxPIC chip 32 and RxPIC chip 34 respectively convert electrical channel signals into optical channel signals (EO conversion) and optical channel signals into electrical channel signals (OE conversion). A transmitter (TX) module of the DLM may include one or more transmitter photonic integrated circuit (TxPIC) chips and the receiver (RX) module of the DLM may include one or more receiver photonic integrated circuit (RxPIC) chips. Thus, for example, there may be more than one 10-channel TxPIC chip 32, such as four such PIC chips to provide a 40 channel combined output. The multiplexed output from the respective chips may be multiplexed or interleaved together. Details of these PIC chips can be found in U.S. patent application Ser. Nos. 10/267,331; 10/267,304; 10/267,330 and 10/267,346, which applications are owned by the assignee herein and are incorporated herein by their reference. Thus, the DLM, therefore, hosts the TX and RX modules containing one or more TxPIC and RxPIC chips.

Not shown in FIG. 8 are associated control and stabilization circuitry for operating these PIC chips which are respectively part of the TX and RX modules of the DLM.

The received serial optical data signal from RxPIC is a differential signal which is received by a 1:N serdes circuit 36, such as, for example, a SFI-4.2 FEC serdes circuit. The two 1:N FEC Serdes 36 and 38 shown in FIG. 8 include a standard interface defined by Optical Internetworking Forum (OIF), which is a 16-bit Low Voltage Differential Signaling (LVDS) interface. The function of serdes 36 and 38 is to deserialize the electrical channel signal into multiple parallel segments for easier signal handling via crosspoint switch 42 as well as to permit higher electrical signal transport latency and faster signal processing. As an example, the incoming electrical channel signal or signals from RxPIC chip 34 on the line side may be a 10 Gbps signal and is deserialized into four 2.5 Gbps signals at the serdes output on the parallel side as illustrated in FIG. 8 as 1:4.

The two serdes 36 and 38 in FIG. 8 are connected to crosspoint switch 42 which is connected to other modules through backplane connector 44 and midplane connector 46. For example, the DLM may connect to multiple channel tributary adapter modules (TAMs) 48 through midplane connector 46 or to another DLM module through the backplane connector 44 with full data plane connectivity. A TAM 48 is an interface to client equipment or devices and applies proprietary encoding to the client signal for client reception. Each TAM 48 may be designed to handle multiple channels, such as two or more 10 Gbps channels. Crosspoint switch 42 needs to support multiple channels with multiple data lanes in each channel. Crosspoint switch 42 is fully non-blocking. The line side traffic from RxPIC chip 34 can pass through the DLM to another DLM, which is also illustrated in principal in FIG. 10, where the client traffic is provided with signal egress to another optical network. This traffic can also be mapped into a different signal channel via wavelength interchange or conversion. Also, the line side traffic may also be directed to any port on the TAMs for tributary add/drop functionality. At the client tributary interface, the client's original signal frequency is extracted from the modified G.709 signal format so that the client's data signal will be appropriate for the client's equipment. In this case, accurate clocking is necessary so that the TAM interface will include appropriate PLL circuitry with a crystal oscillator.

Figure 9:
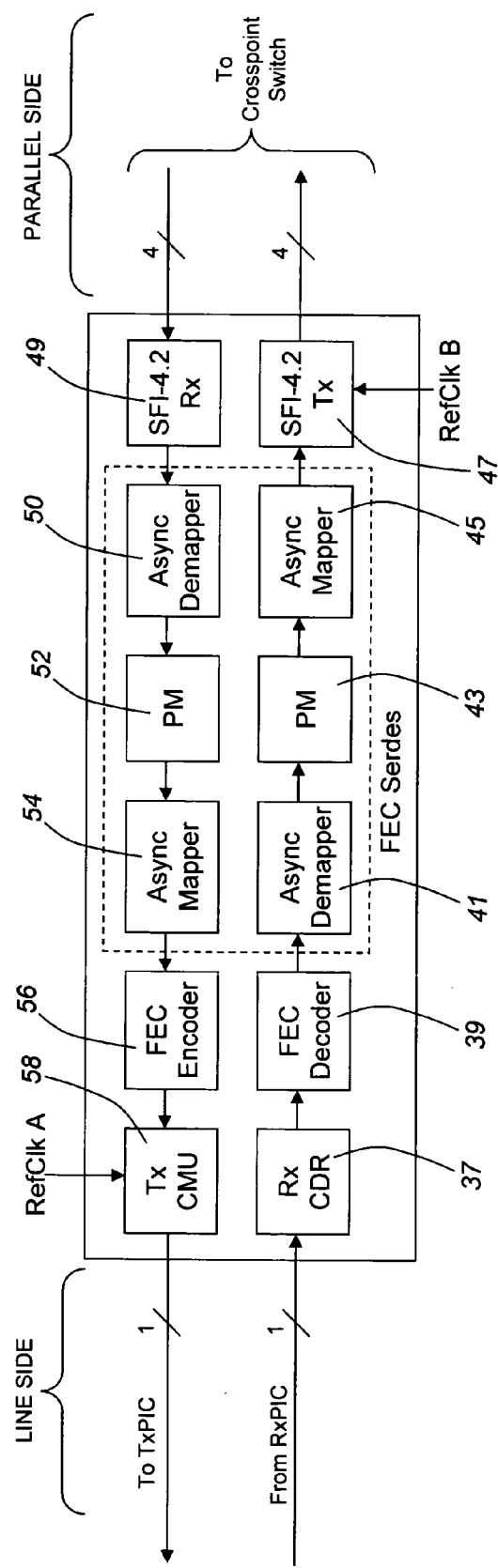
FIG. 9 is a more detailed circuit diagram of a forward error correction (FEC) Serial to Parallel (SerDes) signal transformation that may be employed in the DLM circuit a shown in FIG. 8.

The 3R regeneration function at the DLM FIG. 8 is performed by the two SFI-4 FEC serdes 36 and 38. The RxPIC chip 34 provides an analog signal received waveform. The peak-to-peak swing of the analog waveform is fixed to a certain level by an automatic gain control (AGC) amplifier in the RxPIC module. The SFI-4 FEC serdes 36 and 38 have a built-in limiting amplifier (LA) which converts the received analog waveform to a saturated digital waveform. FIG. 9 is block circuit diagram of a SFI-4 FEC serdes that may be employed with this invention. The receiver front end may have equalization capability which can compensate for frequency dependent loss induced by PCB traces. This is a useful feature when serdes 36 and 38 are some distance away from the RxPIC chips 34 in the RX module.

FIG. 9 is more detailed block diagram of the content of the SFI-4.2 FEC serdes 36 or 38 in FIG. 8 which includes features of this invention. These features are the deployment of FEC in the serdes and the mapping and demapping (remapping) of overhead (OH) and payload from a first clocking rate to a second clocking rate through the use of a free running clock 40 provide to serdes 36 and 38, as previously discussed. The approach of using a local reference clock 21, as seen in FIG. 8 for free running clocks in the serdes does not work unless there is mapping and demapping of the channel signal timing. This is because the internal clocks will not be running at the same frequency so that a mechanism must be deployed for insuring that no client traffic or payload is lost due to changes in clocking rates along a signal path in, for example, an intermediate node.

With further reference to FIG. 9 an incoming channel signal, for example, under the line side rate, such as ~10 Gbps, undergoes clock and data recovery (CDR) at 37 to recover the constant line rate 10 Gbps clock and determine the effective payload rate via Table 1 to achieve the proper payload rate. This is followed by FEC decoding at FEC decoder 39. The FEC corrected client signal is then mapped into a signal which allows the client payload to be asynchronously mapped into the modified G.709 frame structure which means that there is a difference in frequency between the client payload signal and the effective payload rate. The effective payload rate is at a higher rate or frequency than the payload signal in order to provide additional bandwidth to run the overhead. However, the frequencies of these two signals continually varies so that it is necessary when deploying such a free running clock scheme at an intermediate node to provide a mechanism by which underflow and overflow between the line side digital wrapper frame (modified ODU digital wrapper frame) and node side digital wrapper frame (modified OPU digital wrapper frame), for example, of the two different signals can be accommodated without losing data, in particular the client payload data. This mechanism is exemplified in FIG. 10 which is explained in more detail later. Thus, what is occurring is that the modified G.709 frame structure or wrapper, such as shown in FIG. 3, is being substituted for the original signal wrapper in order that mapping and demapping of the signals at different clock rates can be accomplished in a manner as previously explained. Thus, it is the modified frame structures in FIGS. 4-6 that permit this to be accomplished. The wrapping at the ingress and the dewrapping at the egress at each node element eliminates all phase noise or jitter (not just a portion of such jitter above the signal frequency), allows the elimination of the need of precision and costly PLL circuitry and crystal oscillators at an intermediate node in the optical link, allows FEC encoding and decoding at each intermediate node in the optical link accurately and with lower throughput data errors, and accomplishes regeneration of the channel signals, all with the elimination of any consideration or requirement for two crystal oscillators and PLL circuits at each intermediate node to handle the transport of different types of client signals.

As shown in FIG. 9, there are two reference clocks, RefClk A which is at the line rate or frequency and RefClk B which is at the payload rate both developed from local CLK 40 (FIG. 8) with the aid of the effective payload rate as previously discussed. Thus, there is a first higher clocking rate for a client signal coming to the FEC serdes at the line side and a second lower clocking rate a client signal in parallel coming out of the FEC serdes at the parallel side. Alternatively, these two reference clocks could also be at substantially the same frequency and it may be more efficient if they are at the same frequency. With clock recovery and FEC decoding, the signal is dewrapped of its overhead at async demapper 41 and rewrapped in async mapper 45 in the modified G.709 frame structure. This processing includes performance monitoring (PM) at 43. After remapping of the signal into the payload rate or frequency, the signal undergoes deserialization at SFI-4.2 Tx circuit 47, as known in the art. In the case here, the signal is shown to be segmented into four separated parallel signals for further processing.

In the opposite direction for an outgoing signal to the line side, the signal from the parallel side is serialized at SFI-4.2 Rx circuit 49, and thence undergoes overhead and payload unwrapping at Async demapper 50 and then rewrapping at async mapper 54 with intervening performance monitoring at 52. The newly rewrapped signal is then FEC encoded at FEC encoder 56 and clock to the TxPIC at, for example, ~10 Gbps. The clocking rate at 10 Gbps, for example, is achieved through the use of a clock multiplying unit (CMU) 58 to multiply the frequency to the line side rate employing the local reference clock 41 as the node single base clock.

Figure 10:
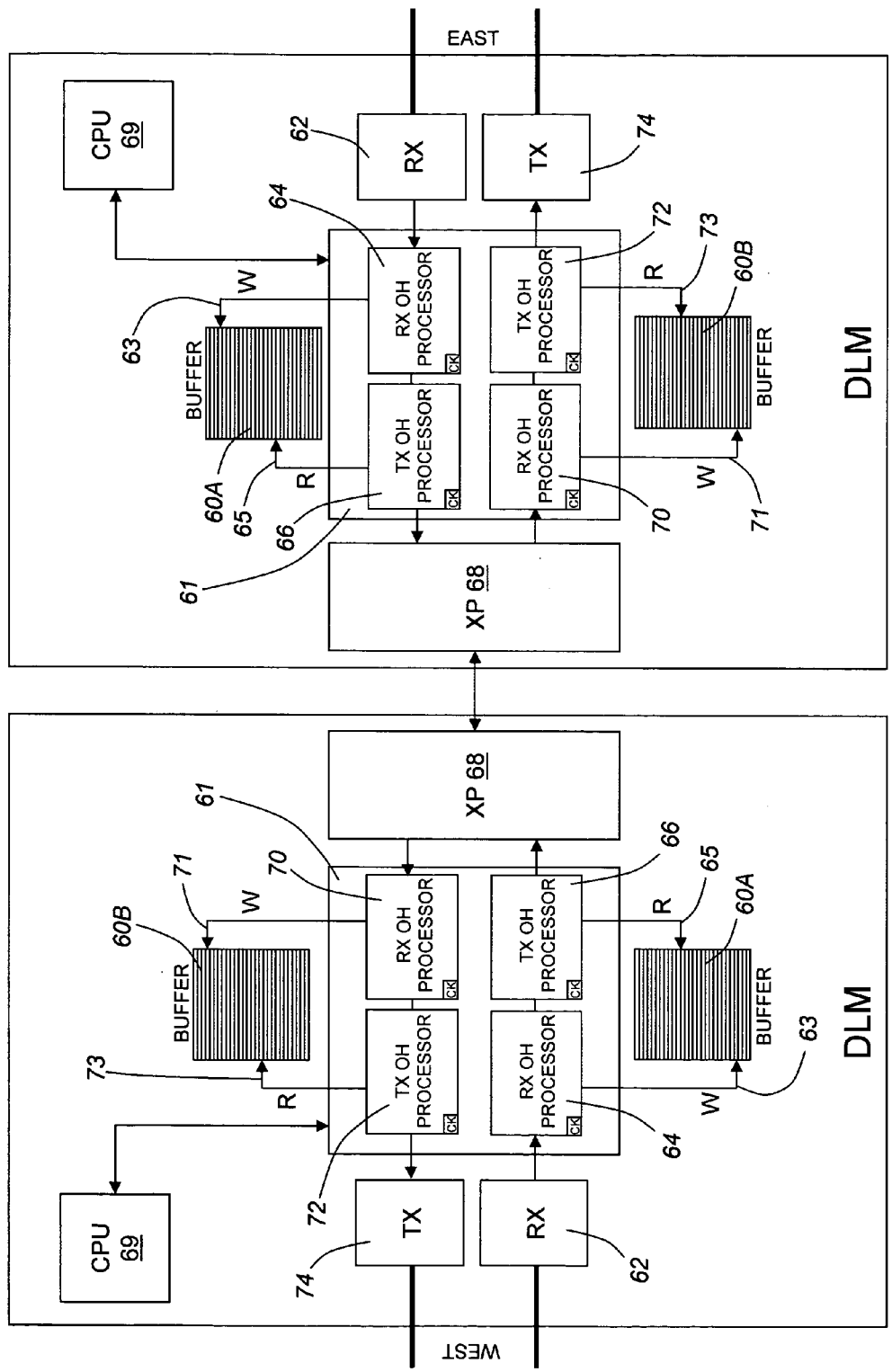
FIG. 10 is a detailed block circuit diagram of an OEO optical transport network intermediate node illustrating the deployment of the asynchronous mapping and remapping of client signals having different payload types.

It is important to note that the G.709 signal protocol, although it can operate asynchronously as previously explained, is not designed for retiming applications, i.e., it is not adapted for handling a payload signal in one time domain to pass through in a second time domain. In particular, the G.7090H protocol is not designed for changes in signal frequency. FIG. 10 disclosed the mechanism by which, in the mappers and demappers of FIG. 9, changes in signal frequency are accommodated due to the deployment of free running clocks based from CLK 40 at an intermediate node since the G.709 protocol, in particular the OPU overhead with its payload and the optical channel data unit (ODU) overhead, are designed to best accommodate synchronous operation.

FIG. 10 shows only a portion of the mapper/demapper of FIG. 9 and relates to asynchronous operation employing a circular buffer, here exemplified as a FIFO 60, to accommodate differences in incoming and outgoing signal frequency requirements of the FEC serdes. Further, FIG. 10 shows a back-to-back DLM scheme which, in reference to FIG. 8, is the channel signal paths, for example, from the line side through the PICs 34 and 36, FEC serdes 36 and 38, crosspoint switch 42 and backplane connector 44 to another DLM.

In FIG. 10, CPUs 69 of the respective DLM modules operates the signal processing unit 61 under the management of a software program which software also includes the data for Table 1. Such software can be frequently updated to include the Table 1 information for additional or changed client signal payload types. Units 61 include electronic processing circuitry in the form of ASIC chips. From either line side, an optical signal or signals come into the RX unit 62 of the DLMs which, in the representation here, includes RxPIC chip(s) 34, CDR circuit 37 and the FEC units 36 and 38. The signal is then received by the RX OH processor 64 in the async demapper where the signal or signals are remapped into a payload frame structure which has different signal timing (client signal payload rate) from the original signal timing (line rate) as explained previously. These differences in timing are accommodated by using circular buffers 60A and 60B, which may be, for example, a 64 byte or 256 byte FIFO circuit. In the case here, the skipped bytes are destuffed or removed from client signal payload. Buffer 60 may also be a delay line, for example. The buffer provides a way of keeping track in the timing difference of the client signal on the receiving side at the RX OH processor 64 versus the other side of buffer 60B at the TX OH processor 66 where the clocking rate will be the payload rate of the particular client signal. Iterations of the payload bytes are written into the buffer by a write (W) pointer 63 by the RX OH processor 64 while the iterations of the same payload bytes are read out of the buffer via a read (R) pointer 65 by the TX OH processor 66. At this point in time, the channel signal is in a different time domain, i.e., the payload rate time domain, and is further processed via deserialization and signal processing as provided to the crosspoint switch (XP) 68 for, in this case, distribution to another DLM having the same configuration. At the second DLM, the channel signal is handed off to the RX OH processor 70 and the payload bytes are remapped, i.e., restuffed with skipped bytes, buffered at FIFO 60B and then converted into the effective payload envelope for line handling at the line rate at TX OH processor 72. The line rate client signal is then passed to TX unit 74 for conversion from the electrical domain into the optical domain for transport on a fiber transmission span.

As previously discussed, a further important feature of this invention is that the distributing of the FEC encoding through the client signal payload in the line side frame and the node side frame as illustrated in FIG. 5 which has the advantage of permitting the use of smaller capacity FIFOs 60A and 60B since the these distributed FEC as well as skipped bytes can respectively be ignored by the FIFO circuits.

The asynchronous processing is the same in the case of demapping and mapping for signal transmission from each of the back-to-back DLMs via TxPIC chip(s) at TX modules 74. Thus, the back-to-back DLMs of FIG. 10 represent an optical-to-electrical-to-optical (OEO) signal regenerators between both the electrical and optical domains and provide two different timing domains for the electrical domain signals in order that the line side rate through the network may remain fixed at a higher baud rate. In this connection, each of the processors 64, 66, 72 and 77 in FIG. 10 may have their own free running clocks based from local CLK 40 or may share a free running clock in a particular signal time domain.

In the use of circular buffers to provide for asynchronous timing between different clocking frequencies, it should be realized that, in certain instances, the write (W) or read (R) pointer of a particular buffer may overtake one another. Where the ingress clock rate is faster than the egress clock rate, the write (W) pointer will periodically "lap" the read pointer, resulting in a buffer overflow condition. When this happens, client signal data received but not yet transmitted will be overwritten, resulting in data loss on every signal frame and message corruption on aligned composite signals. Where the egress clock rate is faster than the ingress clock rate, the read (R) pointer will periodically "lap" the write pointer, resulting in a buffer underflow condition. When this happens, the data received and already transmitted will then be retransmitted, resulting in the duplication of every-frame signals and message corruption on aligned composite signals. In these situations, one iteration of the overhead sequence in the buffer is ignored and the buffer is set to operate on a new iteration of the overhead sequence. This is of no consequence or loss to the read side TX OH processor because the OH data comprise multiple, repeated iterations of almost always the same OH data, i.e., this OH data in the modified node side envelope (M-OPU) and the modified line side envelope (M-ODU) changes very slowly so that the loss of one or more iterations of the overhead will have no detrimental consequence on the asynchronous change in the overhead and its accompanying payload.

With respect to the foregoing, there are two requirements that should be met. The first requirement is that all of the line side single-frame signals must be integrated or "debounced" by the Rx unit so that an occasional duplicate or missing byte in an every frame signal does not have an adverse impact. Particular attention needs to be paid to signals which trigger an alarm based on a single data value, where an overflow can result in a false negative detection and an underflow can result in a false positive detection. The second requirement is that the Rx unit be able to gracefully handle the periodic mangling of the message content due to buffer overflow and underflow conditions at the TX side in aligned messages.

Thus, to external client equipment, the optical transmission network disclosed herein will appear as completely transparent to such equipment. By providing asynchronous mapping services, the client signal is through-timed, which eliminates the need for complex network synchronization schemes. SONET add/drop modules, for example, would provide the SONET section and the line side termination functions for a client signal, which would appear to be directly inter-connected to client signals.

In summary, within each node, as illustrated in FIG. 10, the incoming OCh signal is received and terminated at the Rx unit 62. The OCh is converted to an electrical signal carrying the digital wrapper frame. The modified G.709 OTU frames and their overhead signals are terminated on the ingress DLM. Correctable bit errors detected in the line side or M-ODU frame are recovered. A new OTU frame is then generated, including FEC, for example, and passed across the backplane 68. The egress DLM processes the internal OTU frame, generates a new OTU frame, including FEC, and passes the electrical signal to the TX unit 74 where a new OCh signal is created and transmitted.

Thus, in the RX and TX units 62 and 74 of FIG. 10, each of the FEC/serdes circuits of FIG. 9 are asynchronous with respect to each other, as are the ingress and egress DLMs. As a result, there are three independent (plesiochronous) timing domains for a signal passing through such an OEO site.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of providing a single line frequency rate operation between node elements (NEs) of a communication transmission network receiving a multitude of different client signals of different payload types with different client signal payload rates which client signals are propagated at the single line frequency rate between NEs of the network, comprising the steps of:

providing a constant line rate between node elements regardless of the client signal payload rates;

establishing at a node element an overhead ratio (OHR) between the line rate and an effective payload rate where the effective payload rate is determined from a payload offset size from an actual client signal payload size for a particular client signal payload type;

buffering ingress of the client signals at node element where the client signal payload is clocked into the node element at the higher line frequency rate and clocked within the node element at the client signal payload rate; and utilizing the established effective payload rate at the node element to generate the client signal payload clock for clocking the client signals through the node element at the client signal payload rate.

2. The method of claim 1 wherein the line rate is a higher frequency than the client signal payload rate.

3. The method of claim 1 wherein the step of buffering is performed with the use of a first FIFO buffer or a first delay line.

4. The method of claim 1 comprising the further steps of:
buffering egress of the client signals out of the node element where the client signal payload is clocked out of the node element from the lower client signal payload clock into the higher line rate for output from the node element.

5. The method of claim 4 wherein the step of buffering is performed with the use of a second FIFO buffer or a second delay line.

* * * * *